United States Patent [19]

Reinholdson

[11] Patent Number: 5,045,871
[45] Date of Patent: Sep. 3, 1991

[54] DISPOSABLE CAMERA

[76] Inventor: Mark R. Reinholdson, 5040 Madison St., NE., Minneapolis, Minn. 55421

[21] Appl. No.: 375,272

[22] Filed: Jun. 30, 1989

[51] Int. Cl.⁵ .................... G03B 29/00; G03B 17/04
[52] U.S. Cl. .................................. 354/76; 354/188
[58] Field of Search .............. 354/75, 76, 354, 258, 354/202, 221, 212, 145.1, 213, 126; 273/58 G, 213; D16/200-218; 70/456 R, 457, 459

[56] References Cited

U.S. PATENT DOCUMENTS

| | | | |
|---|---|---|---|
| D. 179,803 | 3/1957 | Gillette | D16/202 |
| D. 225,901 | 1/1973 | Yagi | D16/204 |
| D. 258,444 | 3/1981 | Mineshima | D16/202 X |
| 1,700,440 | 1/1929 | Lord | 354/76 |
| 2,625,087 | 1/1953 | Steineck | 354/121 |
| 3,309,976 | 3/1967 | Reiss | 354/354 X |
| 3,412,662 | 11/1968 | Balalis | 354/202 |
| 3,650,194 | 3/1972 | Penick Ib | 354/254 |
| 3,782,730 | 1/1974 | Horchler | 273/213 |
| 3,935,580 | 1/1976 | Klainos | 354/121 |
| 4,268,150 | 5/1981 | Chen | 354/217 |
| 4,306,791 | 12/1981 | Hashimoto et al. | 354/126 |
| 4,370,040 | 1/1983 | Lange | 354/288 |
| 4,497,555 | 2/1985 | Akiyama | 354/212 X |
| 4,518,235 | 5/1985 | Reed et al. | 354/288 X |
| 4,660,951 | 4/1987 | Reed et al. | 354/288 X |
| 4,690,534 | 9/1987 | Chen-Liang | 354/212 X |
| 4,801,957 | 1/1989 | Vandemoere | 354/145.1 X |

FOREIGN PATENT DOCUMENTS 326492 4/1919 Fed. Rep. of Germany ........ 354/76
64-9434 1/1989 Japan .................................. 354/288

Primary Examiner—Brian W. Brown
Attorney, Agent, or Firm—Merchant, Gould, Smith, Edell, Welter & Schmidt

[57] ABSTRACT

In accordance with the present invention, a disposable camera is provided. The disposable camera preferably includes a disposable camera housing and an elongated attachment member detachably attached to the camera housing. When the camera's user is threatened by another individual, the user can use the camera to deter any criminal acts contemplated by the other individual by recording an image of the individual and propelling the camera away from the vicinity. Preferably, the housing is generally spherical in shape and includes a shock-resistant outer layer which minimizes the damage to the housing when the housing is propelled away from a user. The elongated attachment member preferably is configured as a key chain or other attachment member for attachment to personal items such as keys, wallets, purses, handbags, belts, buttons, personal clothing, book bags, carryalls, nap sacks and the like. Preferably, the camera housing will include an image recording device equipped to record a plurality of images which may later be used to produce a plurality of pictures. The camera will also include flash bulbs for creating artificial light with which to take a picture.

23 Claims, 4 Drawing Sheets

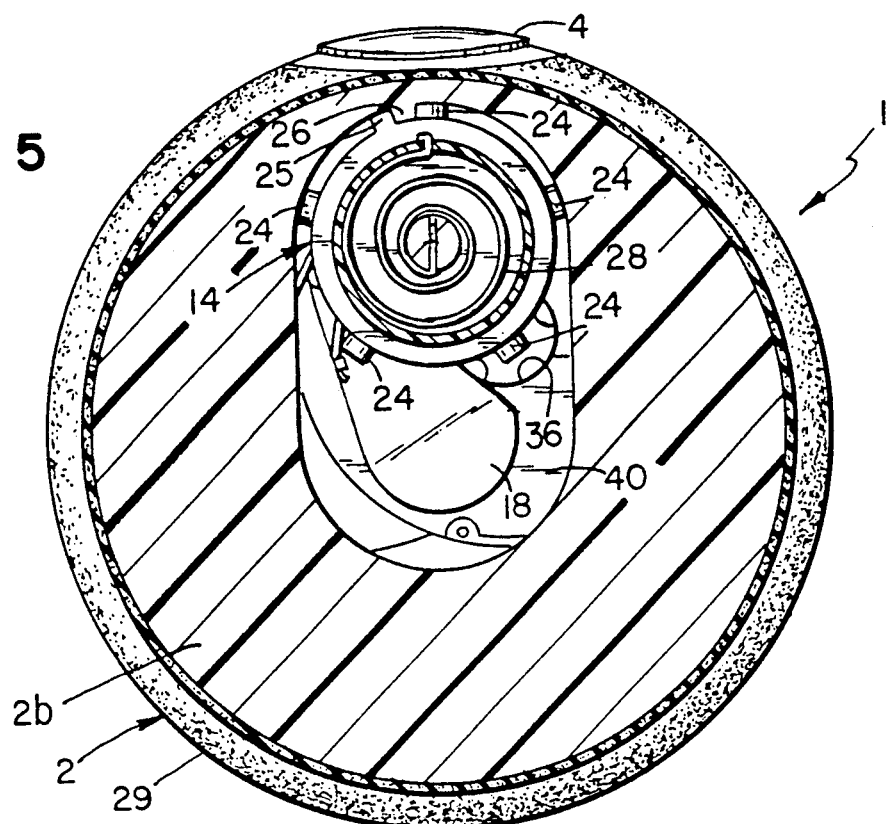
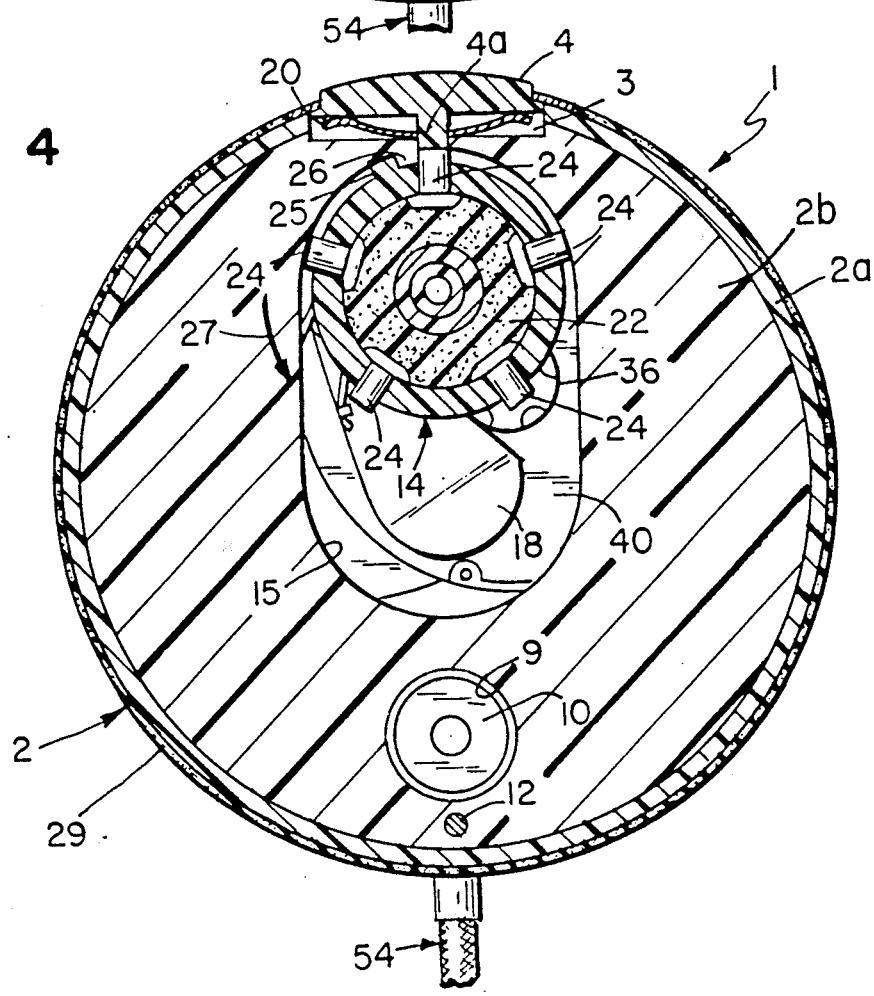

5,045,871

DISPOSABLE CAMERA

FIELD OF THE INVENTION

The present invention relates to a camera, and more specifically, to a disposable, generally spherical camera designed to help provide for increased, personal security.

BACKGROUND OF THE INVENTION

Cameras have been used for many years to provide increased security in banks, retail stores, hotels, multiple unit residential buildings and other commercial and/or residential facilities. The use of strategically placed cameras has had a deterrent effect upon criminals, because the pictures taken by the cameras are known to help law enforcement authorities identify suspects wanted for further questioning in connection with events recorded in pictures taken by the respective cameras. In order to help law enforcement authorities identify suspects, however, the pictures taken by the respective camera must be accessible to the authorities following the events recorded in the pictures. Therefore, the camera must be located in either a remote or a secure location, one which is inaccessible to suspects intent upon destroying the film and/or the camera from which the pictures are to be obtained.

The personal use of a portable camera to deter would be criminals from committing criminal acts, particularly those which may be injurious to the person of the individual using the camera, has been believed to be ineffective because the camera is not located in a remote or a secure location so as to be inaccessible to the criminal after it is used and, therefore, likely to be subsequently accessible to the appropriate authorities.

It will be appreciated that prior art cameras leave this and other problems unsolved. The present invention includes a camera which can be used by an individual to deter criminals intent on harming them. In this way, the camera can be used to increase the personal security of an individual using such a camera. Other problems are also solved by the present invention.

SUMMARY OF THE INVENTION

In accordance with the present invention, a disposable camera is provided. The disposable camera preferably comprises a disposable camera housing and an elongated attachment member detachably attached to the camera housing. When the camera's user is threatened by another individual, the user can use the camera to deter any criminal acts contemplated by the other individual by recording an image of the individual and subsequently propelling the camera away from the vicinity. Preferably, the housing is generally spherical in shape and preferably includes a shock-resistant outer layer which minimizes the damage to the housing when the housing is propelled away from a user. The elongated attachment member preferably comprises a key chain or other attachment member for attachment to personal items such as keys, wallets, purses, handbags, belts, buttons, personal clothing, book bags, carryalls, nap sacks and the like. Preferably, the camera housing will include image recording means for recording an image. Said image recording means will preferably include means for recording a plurality of images which may later be used to produce a plurality of pictures. In preferred embodiments, the camera housing will include flash means for creating artificial light with which to take a picture.

The possessor of a disposable personal security camera of the present invention will utilize the camera when there is a threat of crime or violence in his or her vicinity. When the possessor is threatened or scared by another whom the possessor believes to have criminal intent, the possessor will direct the front of the camera toward the perpetrator and depress a shutter button. At least one photo will then be taken of the perpetrator. Upon the realization that an image has been recorded or "a picture has been taken" which can potentially identify him or her, the perpetrator will exercise one of the following options. The perpetrator will either leave the immediate vicinity, thereby providing the potential victim an opportunity to escape from the threat presented; or the perpetrator will pursue the attack.

In another embodiment, the present invention provides a method of deterring potential criminal perpetrators. This method preferably comprises the steps of providing a disposable camera comprising a disposable camera housing including image recording means for recording an image, and an elongated attachment means for detachably attaching said housing to a personal possession which can be carried by a user; attaching the disposable camera to the personal possession with said attachment means; and carrying said disposable camera and the personal possession when moving from one place to another so that the camera can be used to record an image of a perpetrator if the perpetrator threatens to commit a crime. Preferably, the camera housing will include flash means for providing an artificial light source for taking pictures, wherein said method further comprises the step of taking a picture of said perpetrator wherein the step of taking a picture includes the release of artificial light from said flash means which can alert the perpetrator to the existence of a recorded image of the perpetrator.

The above described features and advantages along with various other advantages and features of novelty are pointed out with particularity in the claims of the present invention. However, for a better understanding of the invention, its advantages, and objects obtained by its use, reference should be made to the drawings which form a further part of the present application and to the accompanying descriptive material in which there is illustrated and described preferred embodiments of the present invention.

BRIEF DESCRIPTION OF THE DRAWINGS

In the drawings, in which like and primed reference numerals and letters indicate corresponding parts of the preferred embodiments of the present invention throughout the several views;

FIG. 4 is a sectional view of the camera from line 4—4 of FIG. 2 showing the drive gear assembly;

FIG. 5 is a sectional view of the camera from line 5—5 of FIG. 2 showing the shutter assembly and rotor assembly;

DESCRIPTION OF THE PREFERRED EMBODIMENTS

Figure 1:
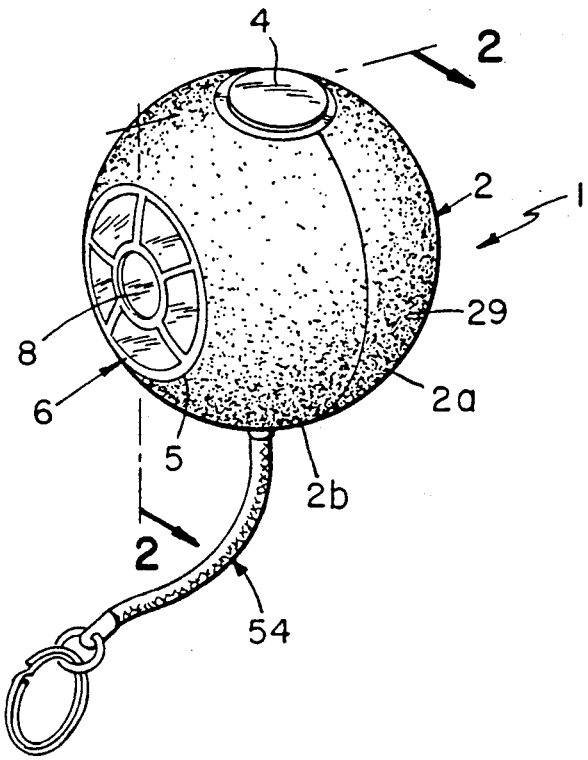
FIG. 1 is a perspective view of a camera in accordance with the present invention.
Figure 2:
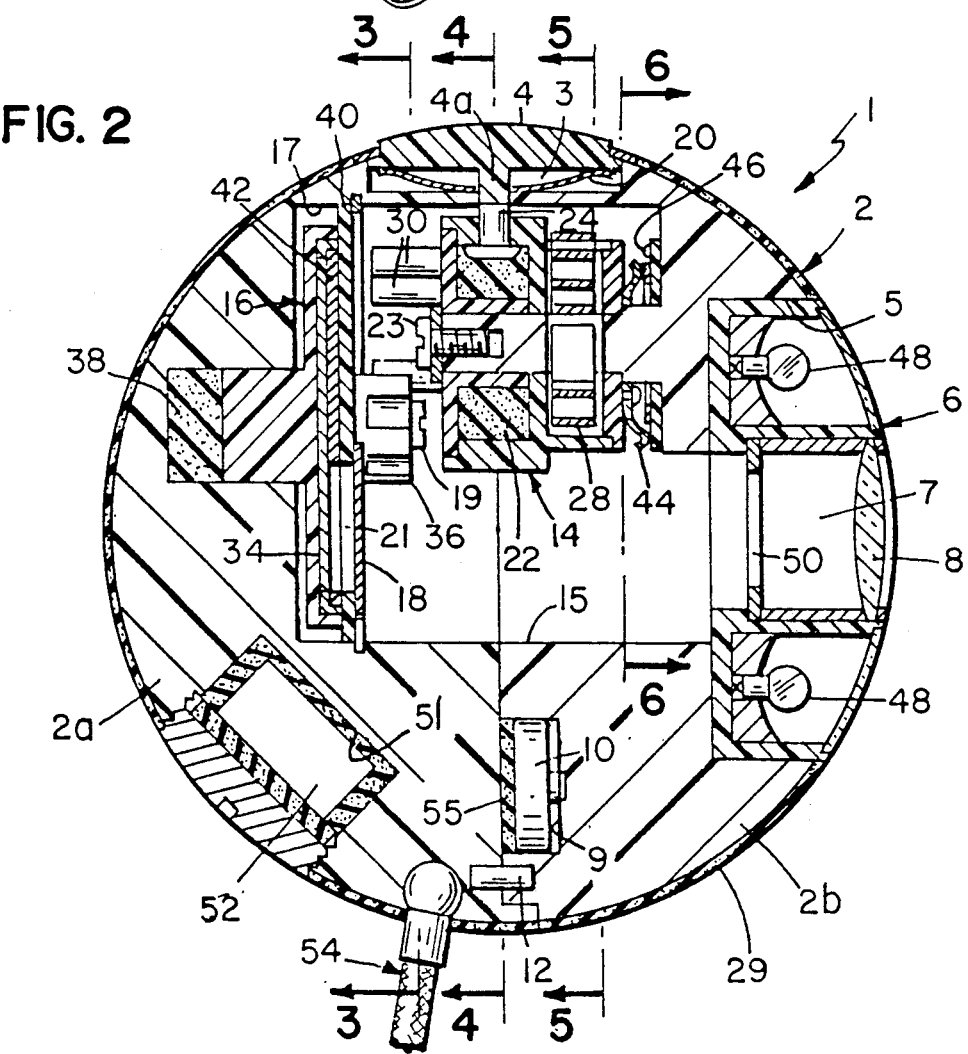
FIG. 2 is a sectional view of the camera shown in FIG. 1 from line 2—2 thereof.

Referring now to the drawings, and more particularly to FIGS. 1 and 2, a preferred disposable camera 1 in accordance with the present invention is illustrated. The disposable camera 1 has a generally spherical shape so that it can roll when thrown along the ground. Camera I preferably includes a camera housing 2, which is preferably fabricated from a highly impact resistant injection polymer such as polystyrene or the like. Preferably, the outer layer 29 of the housing 2 is a shock-resistant material, such as a foam material, which minimizes the shock from external forces. Camera housing 2 is constructed, preferably injection molded, in two halves which are preferably secured together during assembly to form camera housing 2. The two housing halves 2a and 2b are preferably secured together with recessed screws (not shown) and/or adjoining members 12 which can be bonded, snap-fit, interference fit or the like, in reciprocating recesses in the respective halves 2a and 2b. Connected to camera housing 2 is an elongated attachment member 54 which can be used to carry camera 1. In the embodiment shown in FIG. 1, elongated attachment member 54 is configured as a key chain. It will be appreciated that attachment member 54 could be configured as a neck strap or other device which attaches to personal items such as clothing, purses, hand bags or the like.

To take a picture, a shutter button 4 is depressed which activates a rotor assembly 14. The rotor assembly 14 motivates a contact wiper 44 and a camera shutter 18. The contact wiper 44 momentarily couples to an electric contact 46 thereby energizing a flash bulb 48 which in turn provides an artificial light. Simultaneously, the camera shutter 18 opens and exposes a camera film 34 housed in a film cam assembly 16. The camera film 34 records an image projected onto it by light passing through a camera lens 8 and an aperture 50.

The camera housing 2 is formed such that an exterior cavity 7 is provided for the camera lens 8 and the aperture 50. The exterior cavity extends through the interior of camera housing 2 from the lens 8 to the film cam assembly 16. An exterior cavity 5 is formed into the camera housing half 2b to house a flash assembly 6 and flash bulbs 48. Flash assembly 6 holds flash bulbs 48 and preferably is fabricated from a reflective material which will focus the artificial light emitted from an energized light bulb 48 onto an object from which an image is being recorded. The camera housing half 2a also includes an interior cavity 17 for the film cam assembly 16. On the side of the film cam assembly 16 adjacent to rotor assembly 14 is a film cam gear 36. The film cam gear 36 is configured to move the camera film 34 when rotated about an axis perpendicular to the plane formed by film 34. The film cam assembly 16 and the film cam gear 36 are secured to the camera housing half 2a by a screw 19. A foam bias 38 is preferably placed between the camera housing half 2a and the film cam assembly 16. The foam bias 38, in combination with the screw 19, prevent inadvertent movement of the film cam assembly 16 and, therefore, the camera film 34, caused by external pressure applied to the camera housing 2 (e.g., dropping, throwing, bumping, or otherwise jolting the camera). It is advantageous to minimize such movement of the camera 1 because it could cause distortions in the image recorded on the camera film 34.

Figure 3:
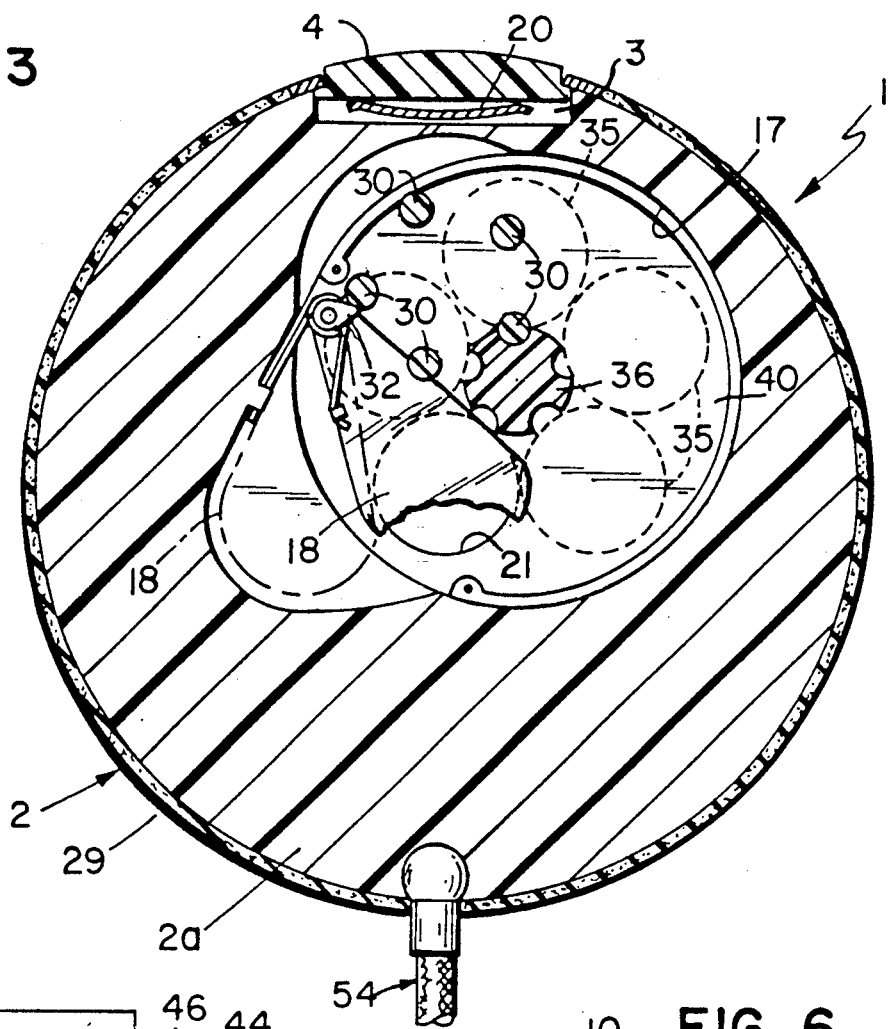
FIG. 3 is a sectional view of the camera from line 3—3 of FIG. 2 showing the shutter mechanism.

Referring now also to FIG. 3, the film 34 includes a plurality of picture frames 35. A film cam cap 40 covers the side of the film 34 adjacent to the camera shutter 18. When the shutter 18 is opened, an image is recorded on one of the plurality of frames 35 which is in an image recording position. When the shutter 18 is closed, it covers an opening 21 in both the film cam cap 40 and a felt fabric 42 which is placed between the film 34 and the film cam cap 40. The felt fabric 42 and the film 34 are pressed together to reduce the likelihood of exposing an adjacent picture frame on the film 34 not in the image recording position. When one of the frames 35 is in the image recording position, it is aligned with the opening 21 in the cap 40 and the fabric 42, as well as the lens 8, so the light passing into the camera through the lens 8 can pass through the aperture 50 and to the frame 35 when the Shutter 18 is opened. In the event that the film cam assembly 16 needs to be removed (e.g., in order to develop the film 34), the camera housing halves 2a and 2b can be separated, the film cam screw 19 can be removed, and the film cam 16 can be lifted out of position in the cavity 17.

Adjacent to and coupled with the film cam assembly 16, is the rotor assembly 14. The rotor assembly 14 is situated in an interior cavity 15 in the camera housing 2. The rotor assembly 14 is secured to the camera housing half 2b by a screw/washer assembly 23. In securing the rotor assembly 14 to the camera housing 2b, the contact wiper 44 is brought into close proximity with the electric contacts 46. Coupled to the side of the rotor assembly 14, adjacent to the film cam assembly 16, are drive pins 30. The drive pins 30 intermittently engage the film cam gear 36 to rotate the film 34 so that a new picture frame 35 is in the image recording position. An internal cavity of the rotor assembly 14 houses a power spiral spring 28. Another internal cavity of the rotor assembly 14 houses a foam bias 22. The foam bias 22 pushes a radial pin 24 toward the shutter button stem 4a. The shutter button 4 and a button spring 20 are situated in an external cavity 3 formed into the camera housing 2. The foam bias 22 in combination with a button spring 20 holds the shutter button 4 in a fixed position until the shutter button 4 is depressed.

Referring now also to FIGS. 4 and 5, movement of the rotor assembly 14 is initiated by depressing the shutter button 4 into cavity 3 with sufficient force to overcome the bias of the shutter button spring 20 and the foam bias 22. When the shutter button stem 4a is depressed, it in turn depresses the rotor assembly radial pin 24 in contact therewith. When the top of the radial pin 24 is positioned below the bottom of a radial pin stop 26, shown in FIG. 4, a tension placed on the rotor assembly 14 by the power spring 28 rotates the rotor assembly 14 in direction of the arrow 27.

As the rotor assembly 14 rotates, a drive pin 30, shown in FIGS. 2 and 3, extending axially from the rotor assembly 14, moves and strikes a shutter lever 32, thereby opening the camera shutter 18 and exposing a frame 35 of the film 34 positioned behind and aligned with the camera lens 8 and the aperture 50. The rotor assembly 14 continues rotation allowing camera shutter 18 under the biasing force provided by a shutter spring 33 to return to the closed position. The drive pin 30 continues to rotate under the biasing force of the power spring 28, until it engages and drives the film cam gear 36 so as to rotate the film cam assembly 16 and the film 34 so that a new picture frame 35 is in the image recording position in preparation for recording a subsequent image.

Rotation of the drive pin 30 and the rotor assembly 14 ceases when the rotation of the rotor assembly 14 is blocked in one of two methods. The first method is used when the shutter button 4 is released after recording an image on a single frame 35. In the first method, a subsequent radial pin 24 is blocked by the shutter button stem 4a. The second method is used when the shutter button 4 is released before completion of recording an image. In the second method, the radial pin 24 is blocked by a radial pin stop 26. In the first method, the shutter button spring 20 is relied upon to overcome the tangential force of the rotor assembly 14 and friction between the shutter button stem 4a and the radial pin 24 when the shutter button 4 is released. After releasing the shutter button 4, the subsequent radial pin 24 is stopped by the radial pin stop 26. The radial brake pin 25 prevents double exposure of any of the picture frames 35 by preventing any rotation of rotor assembly after all available picture frames 35 of film 34 have been exposed.

The camera housing half 2a further has a cavity 9 formed into its exterior which houses a battery 10 and a foam bias 55. The battery 10 is held in the cavity 9 by the foam bias 55 and the battery cover 13. The foam bias 55 prevents inadvertent movement of the battery 10. In the preferred embodiment, the battery 10 is a mercury cell commonly known as a "watch" battery.

Figure 6:
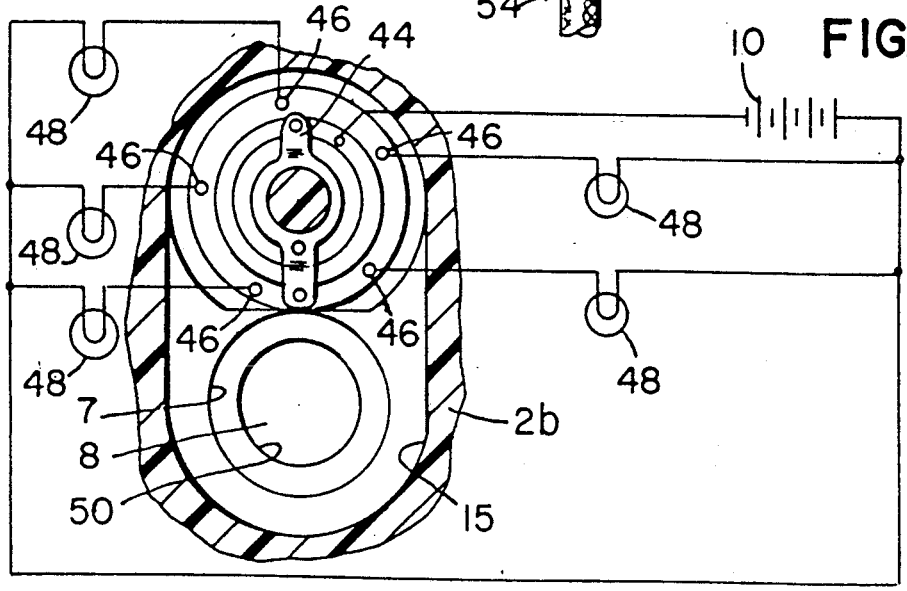
FIG. 6 is a schematic diagram of the electrical circuitry of the camera shown in FIG. 1.

Referring now specifically to FIG. 2 and FIG. 6, the battery 10 is electrically coupled to the contact wiper 44 and the flash bulbs 48. The flash bulbs 48 further are coupled to the electric contacts 46. Preferably, the contact wiper 44 and contacts 46 are fabricated of an electrically conductive material such as beryllium copper. The electrical contact wiper 44 in combination with the electrical contacts 46 serves as a rotary switch. As the rotor assembly 14 rotates, the film cam assembly 16 is driven which in turn opens the camera shutter 18. Simultaneously, the contact wiper 44 couples the electrical contacts 46 which complete an electric circuit with the battery 10 thereby energizing the appropriate flash bulb 48. The flash bulbs 48 are illuminated sequentially corresponding to the picture frame 35 exposed on the film 34.

Figure 7:
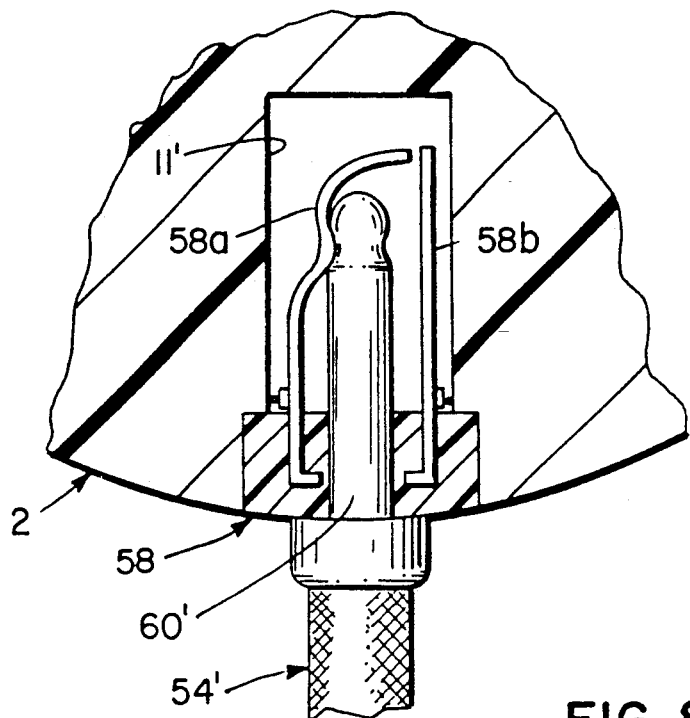
FIG. 7 shows a sectional view of an alternate embodiment of the detachable attachment member shown in FIG. 2.
Figure 8:
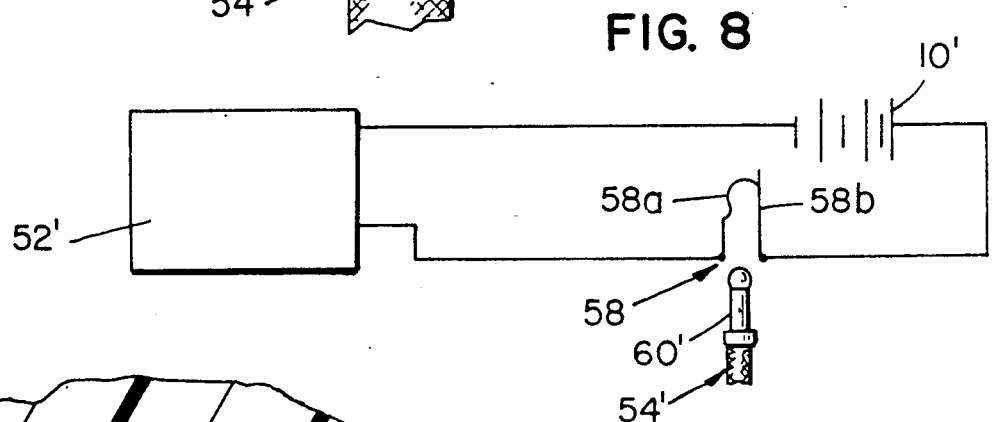
FIG. 8 shows a schematic diagram for electrical circuitry for a transmitter which is included in an alternate embodiment of the camera shown in FIG. 2.

In an alternative embodiment of the invention, the camera 1 further includes a transmitter 52 housed in an interior cavity 51 of the camera housing half 23. The transmitter 52 is electrically coupled to the battery 10. The transmitter 52 enables a person equipped with an appropriately tuned receiver to locate the camera housing 2. Alternatively, as shown in FIGS. 7 and 8, a transmitter 52' may be electrically switched upon removal of an electrically conductive detachable plug 60' by closing contacts 58a and 58b of an electrically conductive jack 58 located in an exterior cavity 11, of camera housing 2'. FIG. 8 shows the completion of the electric circuit between battery 10' and the transmitter 52' when the electrically conductive detachable plug 60' is removed from the electrically conductive jack 58. The electrically conductive detachable plug 60' forms part of an elongated attachment member 54' which can be used to carry the camera 1.

Figure 9:
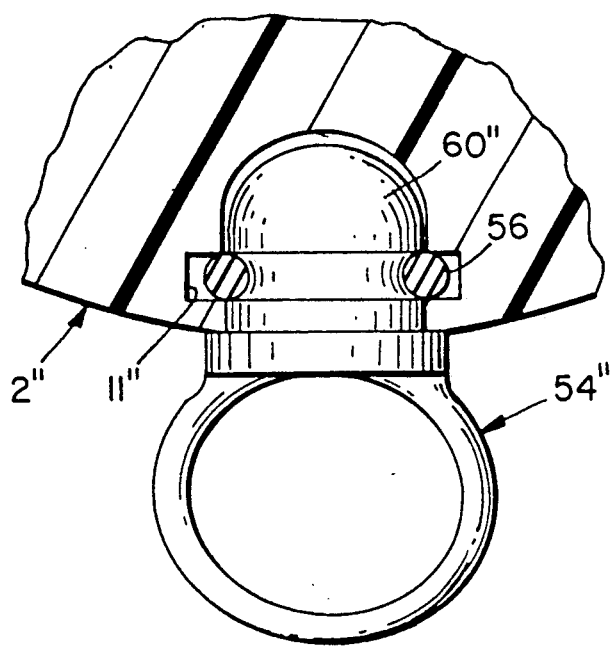
FIG. 9 shows a sectional view of another alternate detachable attachment member shown in FIG. 2 attached to a key ring.

FIG. 9 shows another alternative embodiment in which case an elongated attachment member 54" is removed by exerting an outward force normal to a detachable plug 60 and the camera body 2". As this force is applied, an O-ring 56 expands within an exterior cavity 11 to release the detachable plug 60 thereby releasing the elongated attachment member 54".

The possessor of a camera 1 of the present invention will utilize the camera when there is a threat of crime or violence in his or her vicinity. When the possessor is threatened or scared by another whom the possessor believes to have criminal intent, the possessor will direct the camera lens 8 toward the perpetrator and depress the shutter button 4. At least one image of the perpetrator will then be recorded on the film 34. Upon the realization that an image has been recorded which can potentially identify him or her, the perpetrator will presumably exercise one of the following options. The perpetrator will either leave the vicinity immediately, thereby leaving the potential victim free of any harm; or the perpetrator will pursue the attack. Should the perpetrator continue to pursue the attack, however, the potential victim, having recorded at least one image of the perpetrator, can then detach the camera 1 from the detachable elongated attachment member 54 and throw, or otherwise propel, the camera 1 in a direction away from the perpetrator. The perpetrator will then have to give further consideration to whether to continue to pursue his or her attack. He or she will need to consider whether the camera 1 can be found once the contemplated attack is completed, and may give up his or her pursuit of the potential victim and immediately attempt to locate the camera 1, thereby providing the potential victim with an opportunity to escape.

It will be appreciated that because the camera housing 2 is preferably generally spherical, it will roll, thereby allowing it to be thrown a long distance. Furthermore, because the camera 1 preferably includes a transmitter 52 which will enable law enforcement authorities to find the camera I if and when they mount a search for it, the use of the present invention will help to deter criminals, especially if the use of such devices is well publicized and, therefore, known by potential criminals. It is believed that the light source or flash mechanism will be particularly effective in alerting the perpetrator to the fact that an image has been recorded. Even if publicity about the inventive device has not reached the perpetrator, the flash of the camera light bulbs are well known throughout society and can be expected to alert people to the fact that an image or "a picture" has been "taken" or recorded.

Although particular embodiments of the invention have been illustrated in the accompanying drawings and described in the foregoing detailed description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A disposable camera, comprising:
    (a) a disposable camera housing having a substantially spherical shape;
    (b) an elongated attachment member detachably connected to the camera housing; and (c) locating means for finding said disposable camera after propelling said camera away from the vicinity of a perpetrator.

2. The disposable camera of claim 1 wherein said housing has a shock resistant outer layer effective to reduce damage from the impact of external forces exerted on the disposable camera housing by cushioning the impact thereof.

3. The disposable camera of claim 1 further comprising image recording means for recording an image.

4. The disposable camera of claim 3 wherein said image recording means further includes means for recording individual images on film means including a plurality of frames, each frame being capable of recording an individual image when the frame has been advanced to an image recording position in said camera.

5. The disposable camera of claim 4 wherein said recording means include means for consecutively advancing each of said plurality of frames to said image recording position.

6. The disposable camera of claim 5 wherein said recording means include mechanically-driven means for automatically consecutively advancing each of said plurality of frames to said image recording position.

7. The disposable camera of claim 4 further comprising an artificial light source, the artificial light source providing artificial light to enhance the quality of an image for recording purposes; said light source simultaneously providing light while recording an image.

8. The disposable camera of claim 4 wherein the elongated attachment member includes a key chain.

9. The disposable camera of claim 4 wherein the elongated attachment member includes a strap adapted to be detachably secured to a person or an article detachably secured to a person.

10. The disposable camera of claim 1 wherein the locating means includes a transmitter which can be located by detecting a signal produced by the transmitter.

11. A disposable camera, comprising:
(a) a disposable camera housing having a substantially spherical shape;
(b) an elongated attachment member;
(c) means for detachably attaching said elongated attachment member to said housing, wherein said elongated member can be detached from said housing when it is attached thereto by forcibly separating said housing and said elongated member; and
(d) locating means for finding said disposable camera after propelling said camera away from the vicinity of a perpetrator.

12. The disposable camera of claim 11 wherein said housing has a shock resistant outer layer effective to reduce damage from the impact of external forces exerted on the disposable camera housing by cushioning the impact thereof.

13. The disposable camera of claim 11 further comprising image recording means for recording an image.

14. The disposable camera of claim 13 wherein said image recording means further includes means for recording individual images on film means including a plurality of frames, each frame being capable of recording an individual image when the frame has been advanced to an image recording position in said camera.

15. The disposable camera of claim 14 wherein said recording means include means for consecutively advancing each of said plurality of frames to said image recording position.

16. The disposable camera of claim 15 wherein said recording means include mechanically-driven means for automatically consecutively advancing each of said plurality of frames to said image recording position.

17. The disposable camera of claim 14 further comprising an artificial light source, the artificial light source providing artificial light to enhance the quality of an image for recording purposes; said light source simultaneously providing light while recording an image.

18. The disposable camera of claim 14 wherein the elongated attachment member includes a key chain.

19. The disposable camera of claim 14 wherein the elongated attachment member includes a strap adapted to be detachably secured to a person or an article detachably secured to a person.

20. The disposable camera of claim 11 wherein the locating means includes a transmitter which can be located by detecting a signal produced by the transmitter.

21. A method of providing an image for use as evidence of the identity of a perpetrator, said method comprising the steps of:
(a) providing a disposable camera comprising a disposable camera housing including image recording means for recording an image, and an elongated attachment member detachably attached to said housing, wherein said attachment member can be secured to a personal possession which can be carried by a user;
(b) attaching said disposable camera to the personal possession with said attachment member;
(c) carrying said disposable camera and the personal possession when moving from one place to another so that the camera can be used to record the image of a perpetrator if the perpetrator threatens to commit a crime;
(d) recording an image of the perpetrator;
(e) detaching the disposable camera from the elongated attachment member; and
(f) propelling the disposable camera away from the vicinity of the perpetrator for subsequent location and retrieval.

22. The method of claim 21 wherein said disposable camera further comprises locating means for enabling one to locate said disposable camera after the camera is propelled away from the vicinity of the perpetrator, said method further comprising the step of locating the disposable camera with the aid of said locating means.

23. The method of claim 22 wherein said locating means includes a transmitter which can be located by detecting a signal produced by said transmitter.

* * * * *